United States Patent [19]

Fountain

[11] Patent Number: 4,571,030
[45] Date of Patent: Feb. 18, 1986

[54] SUM-BEAM SEPARATOR USING CRITICAL ANGLE

[75] Inventor: William D. Fountain, Fremont, Calif.

[73] Assignee: Cooper LaserSonics, Inc., Santa Clara, Calif.

[21] Appl. No.: 481,771

[22] Filed: Apr. 4, 1983

[51] Int. Cl.⁴ .............................................. G02F 1/01
[52] U.S. Cl. .................................. 350/385; 350/401
[58] Field of Search ................. 350/370, 401–404, 350/406, 408, 384, 385; 307/424–426

[56] References Cited

U.S. PATENT DOCUMENTS

| | | | |
|---|---|---|---|
| 3,383,460 | 8/1965 | Pritchard | 350/403 X |
| 3,384,433 | 7/1965 | Bloembergen | 350/403 X |
| 3,536,375 | 10/1970 | Mansell | 350/406 X |
| 3,612,652 | 10/1971 | Habegger | 350/406 X |
| 3,904,267 | 9/1975 | Veer | 350/404 X |
| 4,464,018 | 8/1984 | Gagnon | 350/403 X |

OTHER PUBLICATIONS

Vincent, "Emission Polarization Study on Quartz and Calcite", Applied Optics, vol. 11, No. 9, Sep. '72.

*Primary Examiner*—John K. Corbin
*Assistant Examiner*—David Lewis
*Attorney, Agent, or Firm*—C. Michael Zimmerman

[57] ABSTRACT

A device for separating a shorter-wavelength component of a combination-wavelength beam from an orthoganally polarized, longer wavelength component. A combination beam generator produces such a beam which is directed into a positive uniaxial crystal having an input face, an output face, and a pair of parallel faces. Each of the faces is parallel to the crystal axis. The beam enters the crystal through the input face in a predetermined orientation and impinges on the pair of parallel faces at angles greater than the critical angle of the shorter component wavelength and less than the critical angle of the longer component wavelength. The shorter wavelength component is internally reflected on the pair of parallel faces until it exits from the output face. The longer wavelength component is partially externally transmitted at each point of reflection of the shorter wavelength components.

48 Claims, 7 Drawing Figures

SUM-BEAM SEPARATOR USING CRITICAL ANGLE

BACKGROUND OF THE INVENTION

1. Field of the Invention

This invention relates generally to devices utilized to separate a light beam into its spectral and/or polarization components and more specifically to a device which is utilized to separate a short-wavelength component of polarized light from other, orthogonally polarized components in a collinear laser beam.

2. Description of the Prior Art

Many devices are known to exist for the separation of two orthogonally polarized components of a single light beam. The family of Glan-type prisms, in which the wanted beam component is transmitted and the unwanted beam component is reflected, are such devices. However, Glan-type prisms are formed of calcite and are not suitable for the short-wavelength applications to which the instant invention is applied, due to the low transmission of calcite-based designs at such short wavelengths. A commercially offered "UV Glan-Taylor" device of reasonable dimensions has a transmittance of approximately 10% at 217 nm.

Another family of well known prism devices includes the Rochon and Wollaston types of prism separators, and variants thereof. Such devices are or can be composed of crystal quartz and are useful at short wavelengths. However, the wanted and unwanted components of the light beam are separated by only a small angle and therefore it is difficult to completely separate a wide beam in a short distance from the exit face of such devices. These non-Glan-type prior-art devices have the additional drawbacks that the wanted output beam is not necessarily collinear with the input beam, and the direction and/or position of the output beam may be a function of its wavelength Dichroic reflectors, selective absorbers, and simple dispersing devices such as prisms and diffraction gratings, may be used for purely spectral separation. Simple prisms suffer all of the disadvantages of the aforementioned non-Glan-type prior-art devices. The other purely spectral devices are at best difficult to fabricate for use with the short wavelengths and high powers involved herein, and are not well suited for use in the important case where the wavelengths to be resolved vary widely. Gratings also suffer all of the disadvantages of simple prisms, except that they suffer the problem of overlapping multiple orders rather than that of small angular separation.

SUMMARY OF THE PRESENT INVENTION

It is therefore an object of the present invention to provide a device which immediately widely separates the wanted and unwanted components of the input beam.

It is another object of the present invention to provide a device in which the direction and location of the output beam are substantially independent of the wavelengths of the input beam components.

It is a further object of the present invention to provide a device in which the output beam is in collinear alignment with the input beam.

It is yet another object of the present invention to provide a device which takes advantage of both wavelength and polarization differences of the components of an input beam to separate the wanted shorter-wavelength component.

The sum-beam separator of the present invention functions to separate the shorter-wavelength component of a combination beam from other, orthogonally polarized, longer-wavelength components. Such a combination beam may be created during a nonlinear optical process, such as doubling or mixing the output of a tunable dye laser in a nonlinear optical material. In this case, the combination beam will comprise the shorter-wavelength sum beam together with the longer-wavelength residua of the generating beams.

A first embodiment of the present invention consists of a single crystal quartz prism having an input face that is approximately perpendicular to the incoming beam and an output face that is approximately parallel to the input face. The crystal has two mutually parallel reflecting/transmitting faces, which are oriented relative to the input beam such that when the input beam strikes the reflecting/transmitting faces, the shorter-wavelength component thereof is totally internally reflected and the longer-wavelength components thereof are partially transmitted. The internally reflected, wanted beam is bounced between the mutually parallel reflecting/transmitting faces several times. At each bounce, the shorter-wave-length, wanted component is totally internally reflected and the longer-wavelength, unwanted components are partially transmitted. Following several bounces, the internally reflected, wanted component is substantially cleansed of the unwanted wavelength components and is permitted to exit the crystal through the output face. The output beam is a substantially pure short-wavelength component of the input beam. For effective operation of the device, the crystal is oriented such that its optical axis is perpendicular to the input beam and parallel to the input/output and reflecting/transmitting faces, and further oriented such that the effect of birefringence, based upon the orthogonal polarizations of the wanted and unwanted components, is additive to the effect of dispersion, based upon the differing wavelengths of the wanted and unwanted components. An alternative embodiment of the single crystal device has one reflecting/transmitting face, whereby a single bounce of the input beam occurs.

A second embodiment of the present invention utilizes two prisms, preferably composed of crystal quartz, in a chevron orientation. This embodiment returns the output beam to the same linear direction and position as the input beam and creates ease of alignment of laser devices, experimental apparatus, etc. Once set up, the collinearity of the input and output beams of the chevron device is substantially independent of changes in wavelength of any of the input beam components.

It is an advantage of the present invention that the wanted and unwanted components of the input beam are immediately and widely separated.

It is another advantage of the instant invention that the direction and location of the output beam are substantially independent of the wavelengths of the input beam components.

It is a further advantage of the present invention that the output beam may be made to be collinear with the input beam.

It is yet another advantage of the present invention that both wavelength and polarization differences of the incoming components are utilized to separate and select the shorter-wavelength component of the input beam.

These and other objects and advantages of the present invention will no doubt become apparent to those skilled in the art after reading the following detailed description of the preferred embodiments which are illustrated in the several figures of the drawing.

IN THE DRAWING

FIG. 3a depicts an alternative embodiment of the device depicted in FIGS. 1 and 2;

FIG. 3b depicts a single-bounce alternative of the device depicted in FIG. 3a;

DETAILED DESCRIPTION OF THE PREFERRED EMBODIMENT

The sum-beam separator of the present invention is utilized to separate the shorter-wavelength component of a light beam from orthogonally polarized longer-wavelength components. Such a sum beam generally arises from nonlinear optical processes involving high-power lasers wherein doubling or mixing operations are performed. The device is particularly useful in separating the wanted short-wavelength (217–420 nm) radiation from the longer-wavelength (355–1064 nm) residual generating radiation. A first embodiment utilizes a single crystal to achieve separation, and a second embodiment utilizes two crystals to achieve both separation and collinearity of the output beam with the input beam.

Figure 1:
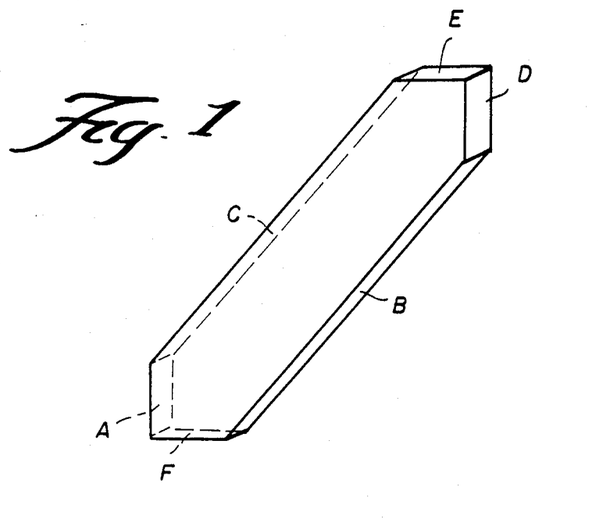
FIG. 1 is a perspective view of a single-crystal embodiment of the present invention.
Figure 2:
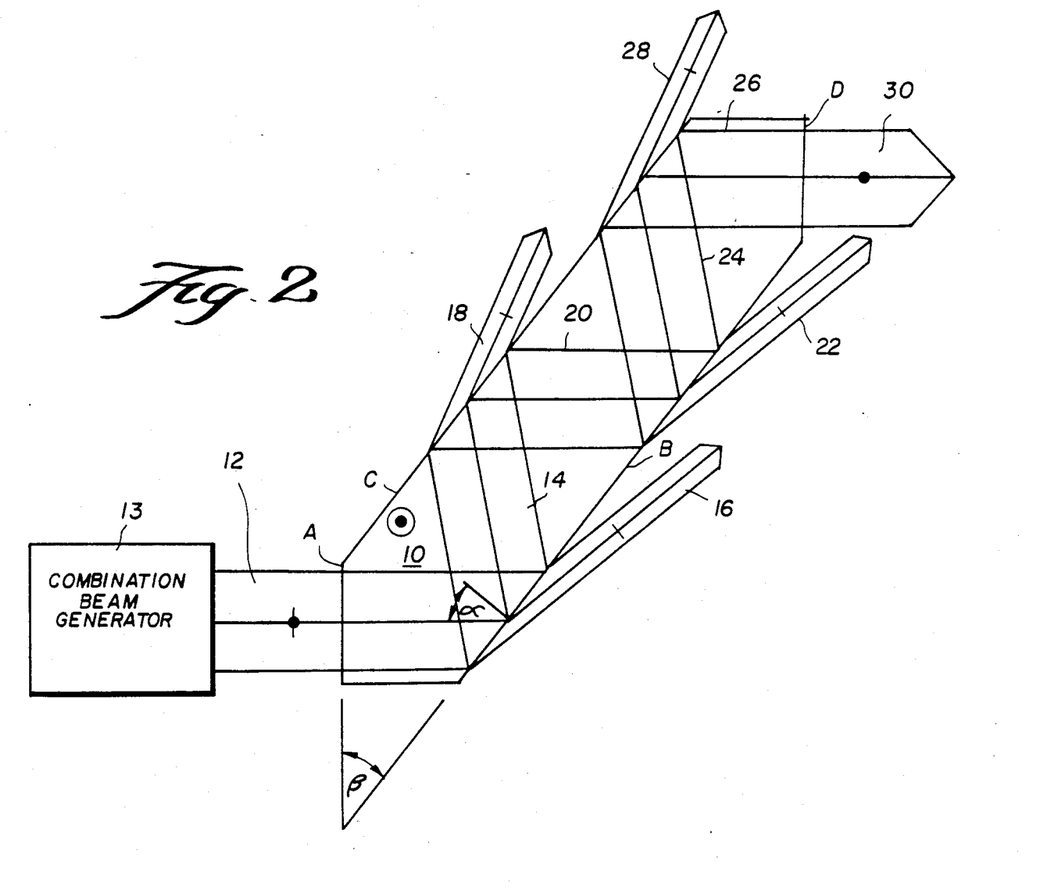
FIG. 2 is a top plan view of the single crystal depicted in FIG. 1.

As depicted in FIGS. 1 and 2, a preferred embodiment utilizes a positive uniaxial crystal, or a nearly degenerate biaxial crystal that can be treated as a positive uniaxial crystal. Crystal quartz is a preferred material; however, crystals composed of magnesium fluoride, or other appropriate materials could be substituted therefor. For a sum-beam separator of reasonable dimensions, constructed according to these teachings, the path of material traversed by the wanted beam generally exceeds 100 mm. Assuming a throughput in excess of 50% for the wanted beam, the loss coefficient of the crystal should not greatly exceed ½% per mm at the shortest wavelength of interest. This criterion is met by magnesium fluoride down to approximately 175 nm and by crystal quartz down to approximately 217 nm, but by calcite only down to approximately 250 nm. The other criterion is that the crystal exhibit sufficient birefringence ($N_e$–$N_o$ of approximately 0.012 or greater); additionally, it is very desirable that the critical angle for the e-ray be close to Brewster's angle for the o-ray at the wavelengths of interest.

As depicted in FIGS. 1 and 2, the crystal 10 is formed with an input face A, a reflecting/transmitting face B, a reflecting/transmitting face C, and an output face D. In the preferred embodiment, faces A and D are parallel and faces B and C are parallel; faces A, B, C and D are all highly polished to provide good optical properties. The orientation of the optical axis of the crystal 10 is such that the optical axis is parallel to each of faces A, B, C, and D. Faces E and F may be utilized as alternative input and output faces, as is hereinafter described.

As is best depicted in FIG. 2, an input combined beam 12 is shown as produced by a combination beam generator 13, such as a high power laser described previously. Generator 13 provides means for generating beam 12 which has a component existing in a predetermined range of shorter wavelengths (such as 217–420 nm) and a component existing in a predetermined range of generally longer wavelengths (such as 355–1064 nm), wherein the wanted, shorter-wavelength component has a direction of polarization which is parallel to the optical axis of the crystal 10, and the unwanted, longer-wavelength components have a direction of polarization which is perpendicular to the optical axis of the crystal 10. Thus, when propagating through the crystal 10, the wanted component propagates as an extraordinary ray (e-ray) and the unwanted components propagate as an ordinary ray (o-ray). The combination beam 12 enters the crystal through input face A and strikes face B. The crystal is oriented with respect to the direction of the beam 12 such that the angle of incidence $\alpha$ on relecting/transmitting face B is greater than the critical angle for the wanted e-ray but less than the critical angle for the unwanted o-ray, and preferably as close as practicable to the Brewster's angle for the o-ray. In this situation, the e-ray is totally internally reflected, to produce ray 14, while the o-ray is partially transmitted, producing the transmitted ray 16. Depending upon the angle of incidence and the wavelengths of the e-ray and o-ray, it has been found that approximately 85 percent of the intensity of the o-ray can be transmitted at the interface with face B. It will be apparent to those skilled in the art that transmitted beam 16, as well as any other transmitted beams, can be retrieved for use elsewhere in an experimental setup if such be desirable. Thus, the reflected beam 14 contains the e-ray and approximately 15% of the o-ray.

The reflected beam 14 then strikes face C. In that face C is parallel to face B, the e-ray component of beam 14 is again totally internally reflected to become beam 20, and the o-ray is again approximately 85 percent transmitted as beam 18. Thereafter, beam 20, which still contains a small component of the o-ray, strikes face B a second time, whereupon the e-ray is totally internally reflected and approximately 85 percent of the o-ray is transmitted as beam 22. Thereafter, the beam 24, which contains the e-ray and a still smaller component of the o-ray, strikes face C a second time. As before, the e-ray is totally internally reflected to become beam 26 and approximately 85 percent of the remaining o-ray is transmitted as beam 28. After striking face C, the e-ray exits the crystal through face D. The output beam 30 now consists primarily of the e-ray component of the input beam 12 and has an o-ray component which is greatly reduced from its input intensity.

In the preferred embodiment, the crystal 10 is formed such that face A is parallel to face D and such that face A will be approximately perpendicular to input beam 12 for the range of angles of incidence $\alpha$ which are utilized for the wanted short-wavelength e-ray components. Consideration is therefore given to the selection of the angle $\beta$ between faces A and B in order to optimize the performance of the device over the usable range of wavelengths; the significant criteria being that face B should be correctly oriented with respect to the critical angles of the e-ray and o-ray, as described hereinabove, and that face A be substantially orthogonal to the incident beam 12. Table I provides the relevant data for a crystal quartz device for the short wavelengths for which the device is particularly useful.

TABLE I

| WAVELENGTH nm | CRITICAL ANGLE e-ray | CRITICAL ANGLE o-ray | INDEX OF REFRACTION |
|---|---|---|---|
| 217 | 37.52° | | 1.642 (e) |
| 355 | | 39.72° | 1.565 (o) |
| 420 | 39.71° | | 1.565 (e) |

As can be seen from Table I and FIG. 2, an angle $\alpha$ of approximately 39 degrees between the input beam 12 and the normal to face B would be suitable. For example, where the e-ray has a wavelength of 217 nm and the o-ray has a wavelength of 355 nm and the device is oriented such that the angle of incidence on face B is 39 degrees, the e-ray will be totally internally reflected whereas the o-ray will be partially transmitted, and where the angle $\beta$ between faces A and B is 39° face A will be perpendicular to the incident beam 12. In the preferred embodiment, an angle $\beta$ between faces A and B of 39° 43′ has been found to give the best results for the combinations of e-ray and o-ray wavelengths for which the device is suitable. The orientation of face B relative to the incident beam for various combinations of wavelengths of e-ray and o-ray can then be adjusted a few degrees to tune the device for optimal performance, and the approximately orthogonal relationship between face A and the incident beam will vary by only a few degrees.

With regard to crystals composed of magnesium fluoride, the appropriate angle between faces A and B for optimum performance in the short-wavelength area of application is approximately 46 degrees. The preferred embodiment for magnesium fluoride is formed with an angle $\beta$ of 45°57′.

An enhancement upon the preferred embodiment is made by the polishing and utilization of faces E and F as alternative input and output faces. Where high powered lasers cause damage to faces A, B, C, and D upon sustained use, the crystal can be rotated such that faces E and F become the input and output faces and now, undamaged areas of faces B and C are exposed to the beam, thus doubling the life of the crystal. Additionally, faces A and D can be coated with appropriate coatings to enhance reflection or suppress transmission of one or more components of the input beam. It is further contemplated that faces E and F could be differently coated from faces A and D to yield a single crystal which was optimized for different wavelength components of input beams. Still another enhancement would involve the coating of faces B and C to enhance transmission of the unwanted wavelengths of the o-ray.

It is not essential to the operation of the device that face A be parallel to face D. However, where such a parallel relationship is formed, the output beam 30 will be parallel to the input beam 12. Furthermore, it is not essential to the operation of the device that input beam 12 be orthogonal to face A. The essential relationship in the device is the angle of incidence $\alpha$ of the input beam 12 with face B and therefore with parallel face C upon multiple bounces as has been described hereinabove. Experimentation has shown that the angle $\beta$ can be varied from approximately 3° to approximately 121° and a useful device for the range of short wavelength described herein can be made. However, it is to be realized that angle $\alpha$ will still be approximately 39° for such devices, whereby the angle between face A and the incident beam may vary widely from the approximately orthogonal relationship of the preferred embodiment. If the incident beam 12 is significantly non-perpendicular to face A, and/or if exit beam 30 is significantly non-perpendicular to face D, dispersive effects will cause output beam 30 to vary in direction (unless face A is parallel to face D) and in position as its wavelength is changed; however, the wanted and unwanted components of the input beam 12 will still remain immediately and widely separated.

Figures 3A, 3B:
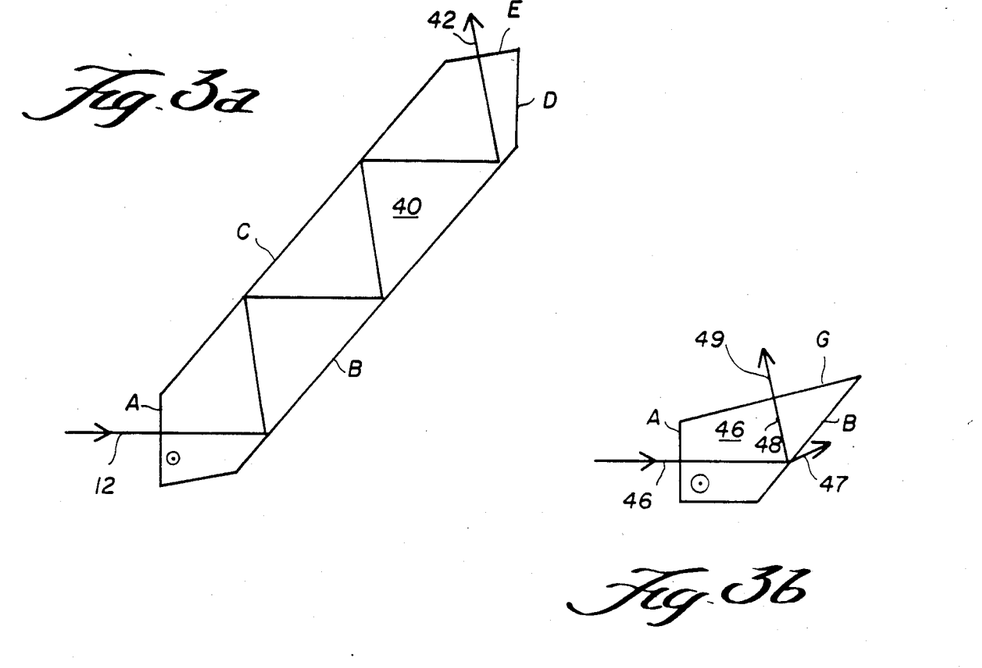

FIG. 3a depicts an alternative embodiment 40 of the device 10 depicted in FIG. 2. The embodiment 40 is an elongated version of the device 10 that has a highly polished exit face E of good optical quality, which face E is oriented substantially normal to the exit beam, whereby the totally internally reflected beam is caused to bounce five times within the crystal. As can be seen from FIG. 3a, the output beam 42 exits through face E of crystal 40 in a direction which is very roughly perpendicular to the direction of incident beam 12. The position and direction of output beam 42 remain substantially independent of the spectral composition of incident beam 12, as before. Of course, a five-bounce device will produce a purer e-ray output beam than a four-bounce device.

The instant invention is not to be limited to the four- or five-bounce configurations depicted in FIGS. 2 and 3a, and single- and multiple-bounce devices providing lesser or greater spectral purity are contemplated herein, which devices are deemed to be obvious from a modification of the length of device 10 or device 40. For ease of understanding, a single bounce device 45 is depicted in FIG. 3b, wherein an input beam 46 enters through face A and impinges upon face B. The input beam is partially transmitted 47 and partially reflected 48, and the reflected beam exits the crystal 45 as output beam 49 through face G, which face G is substantially normal to the output beam 49.

Figure 4:
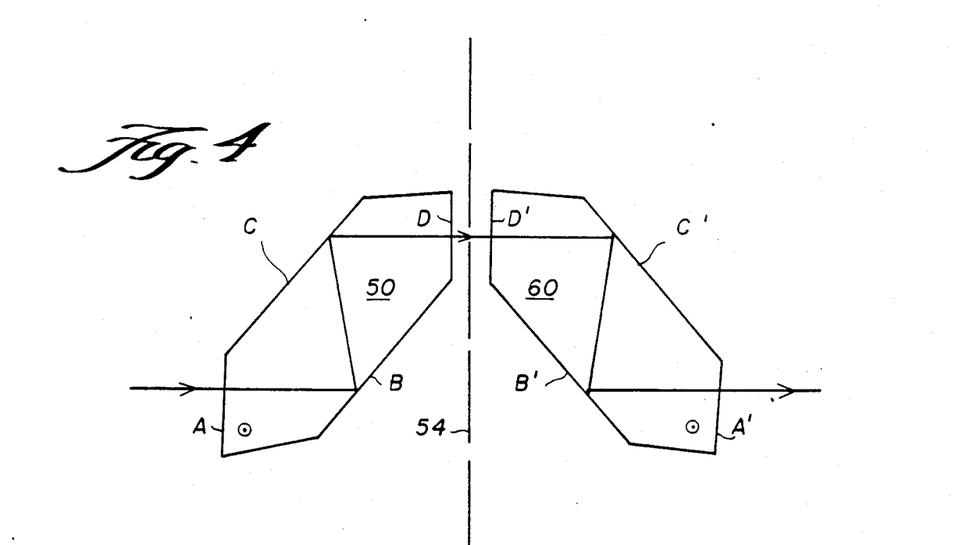
FIG. 4 is a top plan view of a two-crystal, chevron embodiment of the present invention.

FIG. 4 depicts another embodiment of the present invention, wherein two prisms 50 and 60 are arranged in a chevron configuration. Each of the two prisms in FIG. 4 is similar to that depicted in FIG. 2 with the exception that they may be shorter in length, whereby only two bounces of the totally internally reflected beam occur within each prism. The value of the two-prism, chevron device is that the output beam can be made to be collinear with the input beam. This collinear effect is valuable when arranging test or experimental equipment, and it is particularly significant that the collinear relationship is independent of wavelength. The collinear effect is achieved by arranging the two prisms and making any positional adjustments symmetrically about the mid-plane between the two prisms, as represented by line 54 in FIG. 4.

Figure 5:
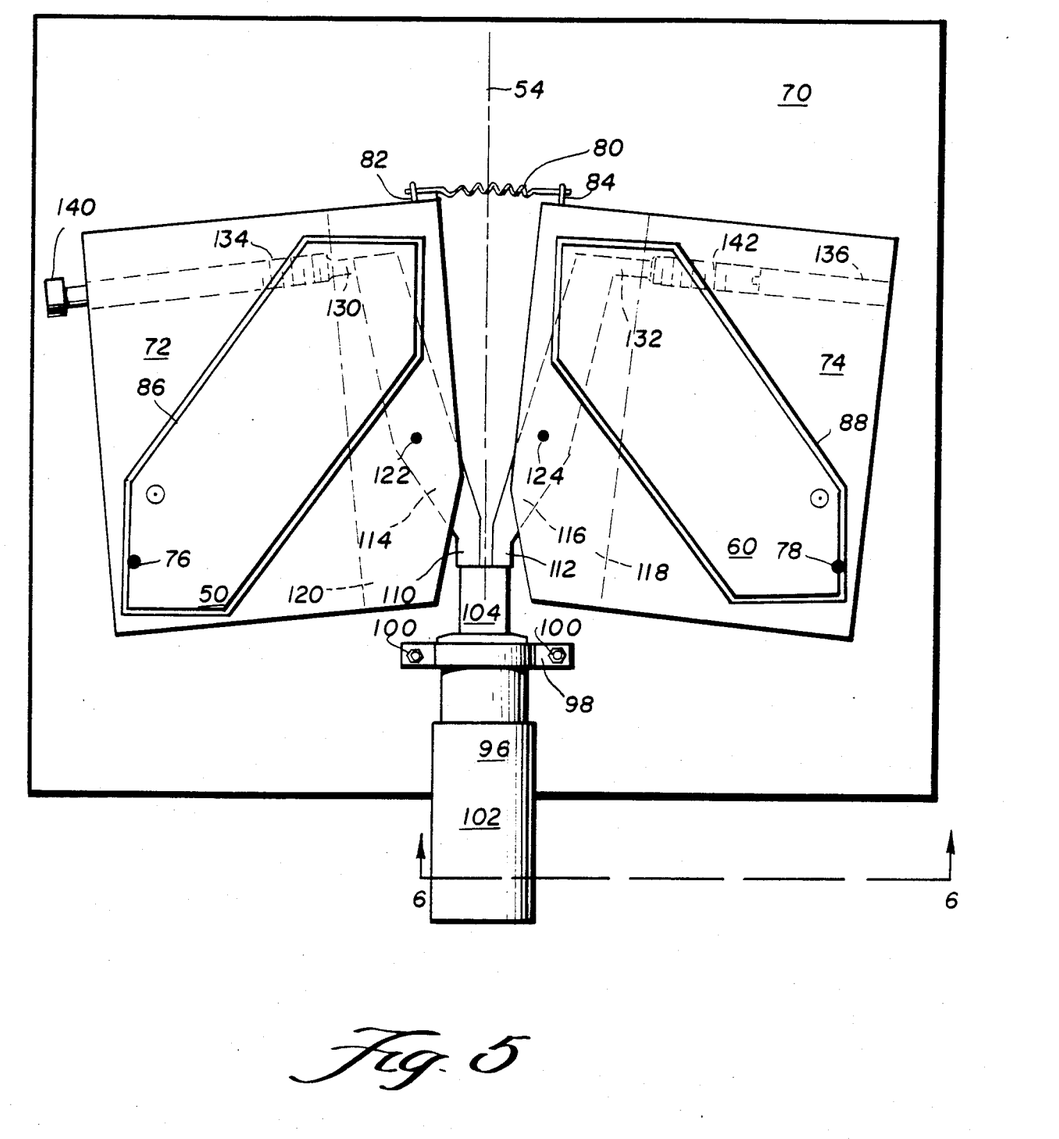
FIG. 5 depicts a device utilizing the two-crystal chevron embodiment of FIG. 4.
Figure 6:
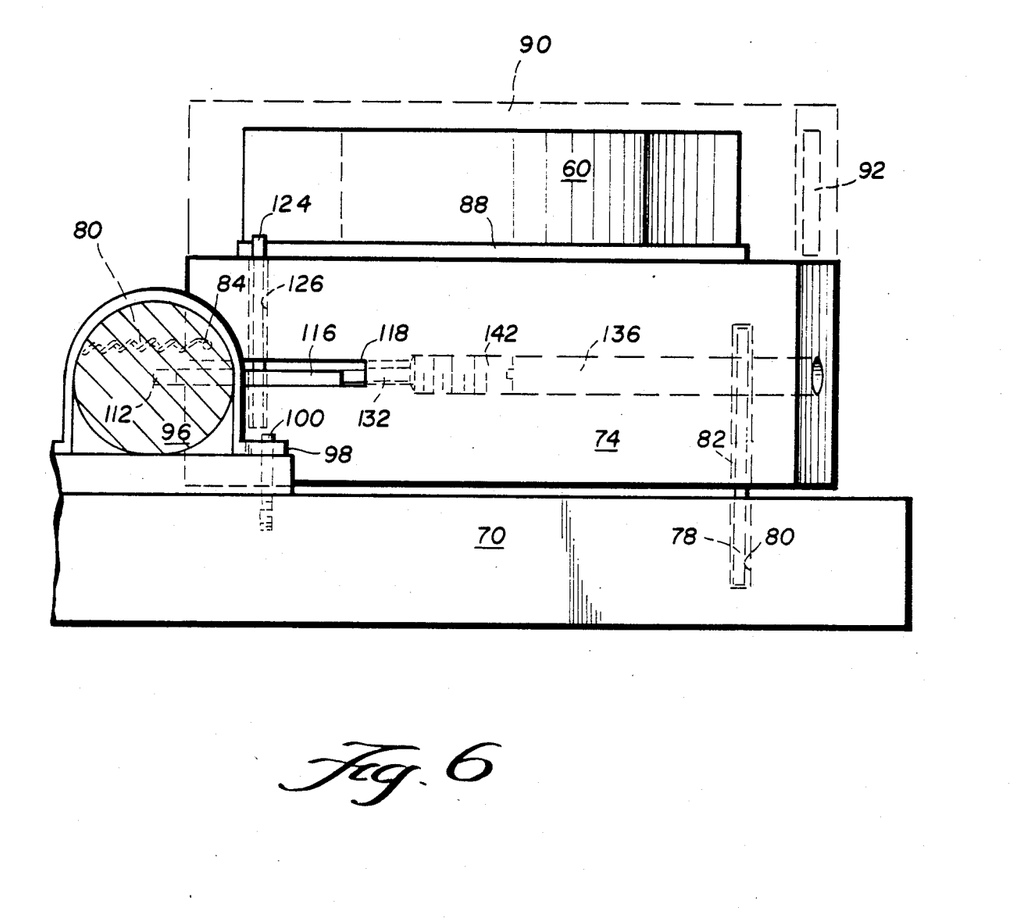
FIG. 6 is a side elevational view taken along lines 6—6 of FIG. 5.

FIGS. 5 and 6 depict a two-prism chevron device utilizing the two-prism configuration depicted in FIG. 4. The device has a base 70 upon which two prism retaining blocks 72 and 74 are pivotally mounted utilizing pivot pins 76 and 78, respectively. As can best be seen in FIG. 6, pivot pin 78 resides in hole 80 formed in base 70 and protrudes into hole 82 formed in block 74. Pivot pin 76 resides in a similar configuration (not shown) within holes formed in base 70 and block 72. The two blocks 72 and 74 are joined together by tension spring 80 which serves to pull the blocks together through interaction with spring pins 82 and 84 and located on blocks 72 and 74 respectively.

The prisms 50 and 60 rest on top of the blocks 72 and 74, respectively, and are held in place by prism retention shoulders 86 and 88, respectively. As is depicted in dashed line in FIG. 6, a prism cover 90 is placed over each of the prisms 50 and 60 to prevent stray light from entering the prisms and to dissipate the transmitted o-rays from the faces of the prisms. The top piece 90 is preferably made from a multiply scattering material, such as "Macor" ceramic, a trademark of Corning Glass Works, with the exterior painted black to aid in the dissipation of the transmitted o-ray beams. Openings, such as 92, are formed in appropriate places in the top 90 to permit the entrance and exit of the light beam from the input and output faces of prisms 50 and 60.

As was discussed hereinabove, the two-prism chevron device may be tuned to the particular wavelengths of incoming light by adjusting the prisms in a symmetrical manner about mid-plane 54. Such a symmetrical adjustment is accomplished through the utilization of a micrometer 96, which is clamped to the base 70 utilizing a simple horse-shoe clamp 98 that is joined to base 70 utilizing screws 100. As is best depicted in FIG. 5, upon rotation of the thimble 102 of micrometer 96, the spindle 104 will act upon the ends 110 and 112 of lever members 114 and 116 which are located within blocks 72 and 74, respectively. As is best depicted in FIG. 6, the lever 116 resides within a slot 118 formed horizontally throughout a portion of block 74. In a like manner, lever 114 resides within a slot 120 formed horizontally throughout a portion of block 72. The levers 114 and 116 are held within the blocks 72 and 74 by pivot pins 122 and 124, respectively. As is best depicted in FIG. 6, pivot pin 124 resides in a hole 126 formed in block 72, which hole 126 permits pin 124 to pass through the lever 116 and thereby retain lever 116 within slot 118. Pivot pin 122 is disposed in a similar manner in block 72. The upper ends 130 and 132 of levers 114 and 116, respectively, penetrate into threaded holes 134 and 136 formed in blocks 72 and 74, respectively, and an adjustable screw 140 and a set screw 142 are located within threaded holes 134 and 136, respectively, to butt the ends 130 and 132 of the levers 114 and 116.

It is therefore to be appreciated that upon rotation of the micrometer thimble 102, the micrometer spindle 104 will act upon the lever ends 110 and 112 to cause simultaneous symmetrical movement of both blocks 72 and 74 about the pivot pins 76 and 78, respectively. It is to be further noted that rotation of adjustment screw 140 will permit block 72 to move about pivot pin 76 without corresponding movement of block 74. Thus, utilization of adjustment screw 140 permits the initial symmetrical alignment of the two prisms 50 and 60 upon blocks 72 and 74, respectively. Thereafter, utilization of the micrometer 96 will create symmetrical movement of both prisms relative to plane 54 between the two prisms. It is to be further noted that pivot pins 76 and 78 are located beneath the entrance face of prism 50 and the exit face of prism 60 respectively. This orientation permits the rotational movement of these prism faces while limiting their translational movement when the device is tuned utilizing the micrometer 96.

As will be clear to those skilled in the art, alterations and modifications may be made to the disclosed embodiment without departing from the invention concepts thereof. The above description is therefore intended as illustrative and informative but not limiting in scope. Accordingly, it is intended that the following claims be interpreted as covering all such alterations and modifications that reasonably fall within the true spirit and scope of the invention.

What is claimed is:

1. A sum-beam separator comprising:
   a positive uniaxial crystal having good transmission properties in the ultraviolet spectral range;
   said crystal having an input face, an output face, and first and second parallel faces, wherein each of said faces is parallel to said crystal axis; and
   means for generating a combination beam having a component existing in a predetermined range of shorter wavelengths and a component existing in a predetermined range of generally longer wavelengths, said components being orthogonally polarized, one to the other, said beam, when traveling through said crystal in a predetermined orientation, being such that the critical angle of the longest of the wavelengths in said range of shorter wavelengths is less than the critical angle of the shortest of the wavelengths in said range of longer wavelengths;
   said crystal being arranged relative to said combination beam such that said beam enters said crystal through said input face in the predetermined orientation and impinges upon said first face at an angle greater than critical angle of the longest of the wavelengths in said range of shorter wavelengths and less than the critical angle of the shortest of the wavelengths in said range of longer wavelengths.

2. A sum-beam separator as recited in claim 1 wherein said shorter-wavelength component propagates through said crystal as an e-ray and said longer wavelength component propagates through said crystal as an o-ray.

3. A sum-beam separator as recited in claim 1 wherein said range of shorter wavelengths is included in the range of 271 to 420 nm and said range of longer wavelengths is included in the range of 355 to 1064 nm.

4. A sum-beam separator as recited in claim 3 wherein said crystal is composed of either crystal quartz or magnesium fluoride.

5. A sum-beam separator as recited in claim 4 wherein the angle between said input face and said first face exists between approximately 3° and approximately 121°.

6. A sum-beam separator as recited in claim 4 wherein the crystal is composed of crystal quartz and the angle between said input face and said first face is approximately 39°.

7. A sum-beam separator as recited in claim 6 wherein the angle between said input face and said first face is approximately 39°43′.

8. A sum-beam separtor as recited in claim 4 wherein said crystal is composed of magnesium fluoride and the angle between said input face and said first face is approximately 46°.

9. A sum-beam separator as recited in claim 8 wherein the angle between said input face and said first face is approximately 45°57′.

10. A sum-beam separator as recited in claim 1 wherein said first and second parallel faces are of sufficient length that a plurality of impingements of said reflected beam will occur on each parallel face within said crystal.

11. A sum-beam separator as recited in claim 10 wherein said input beam is reflected four times within said crystal.

12. A sum-beam separator as recited in claim 10 wherein said input beam is reflected five times within said crystal.

13. A sum-beam separator as recited in claim 1 wherein said crystal is formed with two additional faces which may serve as further input and output faces.

14. A sum-beam separator as recited in claim 1 wherein at least one of said input and output faces is coated to alter the optical properties of said face(s) for particular wavelength components within said combination beam.

15. A sum-beam separator as recited in claim 13 wherein at least one of said two additional faces is coated to provide optical properties for said additional face(s) which differ from the optical properties of said input and output faces.

16. A sum-beam separator as recited in claim 1 wherein at least one of said first or second faces is coated to alter the optical properties of said face(s) for particular longer-wavelength components within said input beam.

17. A sum-beam separator comprising:
first and second positive uniaxial crystals having good transmission properties in the ultraviolet spectral range;
each of said crystals having an input face, an output face, and first and second parallel faces, wherein each of said faces on each crystal is parallel to said crystal axis of said crystal;
means for generating a combination beam having a component existing in a predetermined range of shorter wavelengths and a component existing in a predetermined range of generally longer wavelengths, said components being orthogonally polarized, one to the other, said beam, when traveling through said crystal in a predetermined orientation, being such that the critical angle of the longest of the wavelengths in said range of shorter wavelengths is less than the critical angle of the shortest of the wavelengths in said range of longer wavelengths;
said first crystal being arranged relative to said combination beam such that said beam enters said first crystal through said input face in the predetermined orientation and impinges upon said first face at an angle greater than critical angle of the longest of the wavelengths in said range of shorter wavelengths and less than the critical angle of the shortest of the wavelengths in said range of longer wavelengths;
said second crystal being arranged relative to said first crystal such that said first crystal output beam enters said second crystal through said input face in the predetermined orientation and impinges upon said first face at an angle greater than critical angle of the longest of the wavelengths in said range of shorter wavelengths and less than the critical angle of the shortest of the wavelengths in said range of longer wavelengths.

18. A sum-beam separator as recited in claim 17 wherein said shorter-wavelength component propagates through both said crystals as an e-ray and said longer-wavelength components propagate through both said crystals as an o-ray.

19. A sum-beam separator as recited in claim 17 wherein said range of shorter wavelengths is included in the range of 217 to 420 nm and said range of longer wavelengths is included in the range of 355 to 1064 nm.

20. A sum-beam separator as recited in claim 19 wherein each of said crystals is composed of either crystal quartz or magnesium fluoride.

21. A sum-beam separator as recited in claim 20 wherein either or both said first and second crystals is composed of crystal quartz and the angle between said input face and said first face of each said crystal which is composed of crystal quartz is approximately 39°.

22. A sum-beam separator as recited in claim 20 wherein either or both of said first and second crystals is composed of magnesium fluoride and the angle between said input face and said first face of each said crystal which is composed of magnesium fluoride is approximately 46°.

23. A sum-beam separator as recited in claim 17 wherein said output beam from said second crystal is substantially collinear with the input beam to said first crystal.

24. A sum-beam separator as recited in claim 17 wherein said first and second crystals are disposed symmetrically about a plane which is perpendicular to said output beam from said first crystal.

25. A sum-beam separator as recited in claim 17 wherein at least one of said input faces, output faces, first faces or second faces of at least one of said crystals is coated to alter the optical properties of said separator.

26. A sum-beam separator comprising:
a base;
first prism holding means being pivotally attached to said base;
second prism holding means being pivotally attached to said base;
adjustment means being operative to cause both said first and second prism holding means to pivot about their respective pivotal attachment with said base;
means to compel said first and second prism holding means into contact with said adjustment means;
a first positive uniaxial crystal having good transmission properties in the ultraviolet spectral range being mounted upon said first prism holding means;
a second positive uniaxial crystal having good transmission properties in the ultraviolet spectral range and being mounted upon said second prism holding means;
each of said crystals having an input face, an output face and first and second parallel faces, wherein each of said faces on each crystal is parallel to said crystal axis of said crystal;
means for generating a combination beam having a component existing in a predetermined range of shorter wavelengths and a component existing in a predetermined range of generally longer wavelengths, said components being orthogonally polarized, one to the other, said beam, when traveling through said crystal in a predetermined orientation, being such that the critical angle of the longest of the wavelengths in said range of shorter wavelengths is less than the critical angle of the shortest of the wavelengths in said range of longer wavelengths;
said first crystal being arranged relative to said combination beam such that said beam enters said first crystal through said input face in the predetermined orientation and impinges upon said first face at an angle greater than critical angle of the longest of the wavelengths in said range of shorter wavelengths and less than the critical angle of the shortest of the wavelengths in said range of longer wavelengths;

said second crystal being so arranged relative to said first crystal that said first crystal output beam enters said second crystal through said input face in the predetermined orientation and impinges upon said first face at an angle greater than critical angle of the longest of the wavelengths in said range of shorter wavelengths and less than the critical angle of the shortest of the wavelengths in said range of longer wavelengths.

27. A sum-beam separator as recited in claim 26 wherein said adjustment means and said first and second prism holding means are disposed such that activation of said adjustment means will cause said first and second prism holding means to move symmetrically about a plane disposed perpendicularly to said first crystal output beam of said first crystal.

28. A sum-beam separator as recited in claim 27 wherein means is provided on at least one of said prism holding means to independently adjust said prism holding means to symmetrically align said two prisms relative to said plane.

29. A sum-beam separator as recited in claim 26 wherein said shorter-wavelength component propagates through said crystals as an e-ray and said longer-wavelength components propagate through said crystals as o-rays.

30. A sum-beam separator as recited in claim 26 wherein said range of shorter wavelengths is included in the range of 217 to 420 nm and said range of longer wavelengths is included in the range of 355 to 1064 nm.

31. A sum-beam separator as recited in claim 30 wherein each of said crystals is composed of either crystal quartz or magnesium fluoride.

32. A sum-beam separator as recited in claim 31 wherein either or both of said first and second crystals is composed of crystal quartz and the angle between said input face and said first face of each said crystal which is composed of crystal quartz is approximately 39°.

33. A sum-beam separator as recited in claim 32 wherein the angle between said input face and said first face of each said crystal which is composed of crystal quartz is approximately 39°43′.

34. A sum-beam separator as recited in claim 31 wherein either or both of said first and second crystals is composed of magnesium fluoride and the angle between said input face and said first face of each said crystal which is composed of magnesium fluoride is approximately 46°.

35. A sum-beam separator as recited in claim 34 wherein the angle between said input face and said first face of each said crystal which is composed of magnesium fluoride is approximately 46°57′.

36. A sum-beam separator as recited in claim 30 wherein said crystal is composed of either crystal quartz or magnesium fluoride.

37. A sum-beam separator as recited in claim 36 wherein said crystal is composed of crystal quartz and the angle between said input face and said one other face is approximately 39°.

38. A sum-beam separator as recited in claim 37 wherein the angle between said input face and said one other face is approximately 39°43′.

39. A sum-beam separator as recited in claim 36 wherein said crystal is composed of magnesium fluoride and the angle between said input face and said one other face is approximately 46°.

40. A sum-beam separator as recited in claim 39 wherein the angle between said input face and said one other face is approximately 46°57′.

41. A sum-beam separator as recited in claim 26 wherein said output beam from said second crystal is collinear with said input beam to said first crystal.

42. A sum-beam separator as recited in claim 26 wherein a prism covering means is disposed to cover and surround each said crystal and operative to dissipate all transmitted light from said crystal;

said prism covering means having openings formed therein to permit the entrance and egress of said input and output beams from said crystals.

43. A sum-beam separator as recited in claim 26 wherein at least one of said input faces, output faces, first faces or second faces of at least one of said crystals is coated to alter the optical properties of said separator.

44. A sum-beam separator comprising:

a positive uniaxial crystal having good transmission properties in the ultraviolet spectral range;

said crystal having an input face, an output face and at least one other face, wherein each of said faces is parallel to said crystal axis;

means for generating a combination beam having a component existing in a predetermined range of shorter wavelengths and a component existing in a predetermined range of generally longer wavelengths, said components being orthogonally polarized, one to the other, said beam, when traveling through said crystal in a predetermined orientation, being such that the critical angle of the longest of the wavelengths in said range of shorter wavelengths is less than the critical angle of the shortest of the wavelengths in said range of longer wavelengths;

said crystal being arranged relative to said combination beam such that said beam enters said crystal through said input face in the predetermined orientation and impinges upon said one other face at an angle greater than critical angle of the longest of the wavelengths in said range of shorter wavelengths and less than the critical angle of the shortest of the wavelengths in said range of longer wavelengths.

45. A sum-beam separator as recited in claim 44 wherein said shorter-wavelength component propagates through said crystal an an e-ray and said longer wavelength components propagate through said crystal as an o-ray.

46. A sum-beam separator as recited in claim 44 wherein the angle between said input face and said one other face exists between approximately 3° and approximately 121°.

47. A sum-beam separator as recited in claim 44 wherein at least one of said input face, first face or second face is coated to alter the optical properties of said face(s) for particular wavelength components within said combination beam.

48. A sum-beam separator as recited in claim 44 wherein said range of shorter wavelengths is included in the range of 217 to 420 nm and said range of longer wavelengths is included in the range of 355 to 1064 nm.

* * * * *